United States Patent
Krusche et al.

(10) Patent No.: US 7,590,127 B2
(45) Date of Patent: Sep. 15, 2009

(54) METHOD FOR DATA TRANSFER IN A MULTI-STANDARD NETWORK

(75) Inventors: Arnd Krusche, Stuttgart (DE); Wilhelm Hagg, Korb (DE)

(73) Assignee: Sony Deutschland GmbH, Cologne (DE)

( * ) Notice: Subject to any disclaimer, the term of this patent is extended or adjusted under 35 U.S.C. 154(b) by 532 days.

(21) Appl. No.: 11/047,971

(22) Filed: Jan. 31, 2005

(65) Prior Publication Data

US 2005/0169287 A1 Aug. 4, 2005

(30) Foreign Application Priority Data

Feb. 2, 2004 (EP) .................... 04002243

(51) Int. Cl.
*H04L 12/28* (2006.01)
(52) U.S. Cl. ...................... 370/401; 370/466
(58) Field of Classification Search ........... None
See application file for complete search history.

(56) References Cited

U.S. PATENT DOCUMENTS

| | | | |
|---|---|---|---|
| 6,523,696 B1 * | 2/2003 | Saito et al. | 709/223 |
| 6,671,258 B1 * | 12/2003 | Bonneau | 370/235 |
| 6,768,726 B2 * | 7/2004 | Dorenbosch et al. | 370/331 |
| 6,829,228 B2 * | 12/2004 | Takabatake et al. | 370/338 |
| 2003/0016682 A1 * | 1/2003 | Cho | 370/401 |
| 2003/0185156 A1 * | 10/2003 | Sato et al. | 370/235 |
| 2004/0098531 A1 * | 5/2004 | Hagg et al. | 710/315 |
| 2004/0199625 A1 * | 10/2004 | Makino | 709/223 |
| 2004/0252715 A1 * | 12/2004 | Noda et al. | 370/444 |
| 2005/0151718 A1 * | 7/2005 | Vollmer et al. | 345/156 |
| 2005/0204066 A9 * | 9/2005 | Cohen et al. | 709/249 |

FOREIGN PATENT DOCUMENTS

| | | |
|---|---|---|
| EP | 1 133 129 | 9/2001 |
| EP | 1 396 962 | 3/2004 |
| WO | WO 2004/008693 | 1/2004 |

* cited by examiner

*Primary Examiner*—Phirin Sam
(74) *Attorney, Agent, or Firm*—Oblon, Spivak, McClelland, Maier & Neustadt, L.L.P.

(57) ABSTRACT

A method for data transfer in a multiple-standard network, wherein the network includes a physical gateway, a sophisticated gateway, and a device. The device and the physical gateway are connected via a first connection of a first non-IP physical data transfer standard. The physical gateway and the sophisticated gateway are connected via a second connection of a second non-IP physical data transfer standard. Transmission data that is received at the physical gateway from the device is transmitted to the sophisticated gateway. Thereby, the second connection is a tunnel connection and no bus service is running on the physical gateway. The bus service of the first non-IP physical data transfer standard is running on the sophisticated gateway, thus providing the access of the device to a communication layer.

16 Claims, 5 Drawing Sheets

METHOD FOR DATA TRANSFER IN A MULTI-STANDARD NETWORK

BACKGROUND OF THE INVENTION

1. Field of the Invention

The invention relates to a method for data transfer in a multiple-standard network, a physical gateway for connecting a device of a first non-IP physical data transfer standard to a multiple-standard network, a sophisticated gateway for the use in a multiple-standard network, and to a multiple-standard network. A multiple-standard network could be a home network or an automotive network comprising networks such as IEEE1394, Bluetooth, IEEE802.11, USB, Powerline, etc.

2. Description of Related Art

In known networks, such as the one e.g. described in European patent application EP 02 017 621.0, a plurality of devices are connected to a multiple-standard network via dumb gateways. The devices thereby may be communicating with said multiple-standard network via different standards, such as e.g. Bluetooth, MOST, IEEE802-11, USB (=Universal Serial Bus), Powerline and/or the like.

The dumb gateways used for connecting said devices to the multiple-standard network are thereby specifically designed to be compatible with a specific standard of a device. For example, if a Bluetooth device shall be connected to said multiple-standard network, a Bluetooth compatible dumb gateway must be used. This means, a user who wants to connect a Bluetooth device to said multiple-standard network, must use a dumb gateway compatible with the Bluetooth standard. This implies that a dumb gateway cannot be used for other than for the specified standard.

This also prevents the use of such a standard specific dumb gateway for new standards. In other words, if a new standard currently not known is coming up in the future, then the standard specific dumb gateway cannot be used any more.

BRIEF SUMMARY OF THE INVENTION

It is an object underlying the invention to provide a method for data transfer in a multiple-standard network that enables the use of gateways of a simple structure—which are cheap—that can be used for connecting devices with different standards.

To achieve this object, the invention provides a method for data transfer in a multiple-standard network according to claim 1. In addition, the invention provides network components according to claim 13, a physical gateway according to claim 14, a sophisticated gateway according to claim 15, and a multiple-standard network according to claim 16. Further features and preferred embodiments are respectively defined in respective subclaims and/or in the following description.

The multiple-standard network according to the invention comprises at least one physical gateway, at least one sophisticated gateway, and at least one device, wherein said physical gateway, said sophisticated gateway, and said device are nodes of said multiple-standard network.

The multiple-standard network further comprises a first connection between said device and said physical gateway, wherein said first connection operates according to a first non-IP physical data transfer standard. This means, the first connection complies with said first non-IP physical data transfer standard. "Non-IP physical data transfer standard" means that the first connection does not operate according to the Internet Protocol IP, but to physical data transfer standards such as e.g. Bluetooth, MOST, IEEE1394, IEEE802.11, USB, Powerline, and/or the like.

The multiple-standard network further comprises a second connection between said physical gateway and said sophisticated gateway, wherein said second connection operates according to a second non-IP physical data transfer standard, which second non-IP physical data transfer standard is different from said first non-IP physical data transfer standard, a communication layer that is used by said device, which communication layer receives and/or sends out communication data that comply with a communication layer data format. The communication layer is used by said devices of said multiple-standard network in order to communicate. If e.g. one device that is connected to the network operates according to the first non-IP physical data transfer standard and another device operates according to said second non-IP physical data transfer standard, then the two devices can communicate via this communication layer. The two devices can e.g. exchange data, controlling information, connections, data information, and/or the like.

Said sophisticated gateway comprises a first bus service of said first non-IP physical data transfer standard which first bus service adapts transmission data complying with said first non-IP physical data transfer standard to said communication data layer format or vice versa. In other words, the first bus service converts transmission data of said first non-IP physical data transfer standard into said communication data of said communication layer data standard and/or vice versa.

Transmitting Transmission Data from said Sophisticated Gateway to said Device and Vice Versa:

The method according to the invention comprises the following steps in case of transmitting transmission data from said sophisticated gateway to said device: receiving communication data from said communication layer, using said first bus service for converting the received communication data into said transmission data, transmitting said transmission data or a derivative thereof from said sophisticated gateway to said physical gateway, using said second connection, transmitting said transmission data from said physical gateway to said device using said first connection, and receiving said transmission data at said device.

Advantageously, the inventive method comprises the following steps, in case of additionally transmitting transmission data from said device to said sophisticated gateway: Transmitting transmission data from said device to said physical gateway using said first connection, transmitting said transmission data or a derivative thereof from said physical gateway to said sophisticated gateway using said second connection, using said first bus service for converting and/or adapting the received transmission data into/to said communication data, and receiving said communication data at said communication layer.

Transmitting Transmission Data from said Device to said Sophisticated Gateway:

In case of transmitting transmission data from said device to said sophisticated gateway (without transmitting data vice versa), the inventive method include the following steps: Transmitting transmission data from said device to said physical gateway using said first connection, transmitting said transmission data or a derivative thereof from said physical gateway to said sophisticated gateway using said second connection, using said first bus service for converting the received transmission data into said communication data, and receiving said communication data at said communication layer.

If additionally transmitting transmission data from said sophisticated gateway to said device, the inventive method as defined in the last paragraph may additionally comprise the following steps: Receiving communication data from said communication layer, using said first bus service for converting the received communication data into said transmission data, transmitting said transmission data or a derivative thereof from said sophisticated gateway to said physical gateway using said second connection, transmitting said transmission data from said physical gateway to said device using said first connection, and receiving said transmission data at said device.

One idea of the invention is therefore to transmit said transmission data from said physical gateway to said sophisticated gateway via said second connection and vice versa. Said second connection thereby provides an end-to-end connection from said physical gateway to said sophisticated gateway. The connection between said physical gateway and said sophisticated gateway may be seen as a lower layer connection with respect to the layer of the transmission data. This means, the sophisticated gateway receives the transmission data exactly identical as the physical gateway. The data transmission between said physical gateway and said sophisticated gateway therefore may be referred to as "tunneling". This means, the transmission data is tunneled from said physical gateway to said sophisticated gateway. In this context, a person skilled in the art will know what is meant by said derivative of said transmission data. Said derivative of said transmission data describes the data that is actually transmitted via said second connection. The actually transmitted data, i.e. the derivative of said transmission data contains all the transmission data, however coded according to said second non-IP physical data transfer standard. This means, the packet size, packet format, packet header and/or the like may be different with respect to said first non-IP physical data transfer standard.

It should be noted that according to the invention no bus service is running on said physical gateway. The bus service is running on said sophisticated gateway. In an advantageous embodiment, said sophisticated gateway therefore comprises a bus service data base, and said first bus service is selected and/or loaded from said bus service data base. Said bus service data base may include different bus service modules for different standards. It is an easy task for a person skilled in the art to add further bus service modules to said bus service data base and even future upcoming bus services. This means, a flexible architecture is provided, enabling an easy integration of new bus services into an existing multiple-standard network.

Advantageously, said communication layer provides data transfer, controlling functions, and/or the like for said device.

Advantageously, said physical gateway comprises at least one FIFO buffer and said transmission data is temporarily stored in said FIFO buffer. This enables the adaptation of possibly different data rates of said first connection and said second connection.

In case of transmitting transmission data from said device to said sophisticated gateway, the inventive method comprises the following steps: Coding said transmission data in order to obtain said derivative of said transmission data, and transmitting said derivative of said transmission data over said second connection. "Coding" here means to adapt the transmission data that are compatible with said first non-IP physical data transfer standard to said second non-IP physical data transfer standard. This means e.g. to add respective headers and/or adapt the packet size to said second non-IP physical data transfer standard.

In case of transmitting transmission data from said sophisticated gateway to said device the inventive method comprises the following steps: Decoding said derivative of said transmission data in order to obtain said transmission data, and transmitting said transmission data over said first connection. Decoding means to obtain the original transmission data that have been output by said first bus service.

Further, said first connection may comprise an asynchronous connection and said transmission data may comprise asynchronous transmission data. Also, said second connection may comprise an isochronous connection. In this case, said method may comprise the following step: Transmitting said asynchronous transmission data via said isochronous connection.

Advantageously, said sophisticated gateway comprises an ISO-handler. In case of transmitting transmission data from said sophisticated gateway to said device, said ISO-handler is used for receiving asynchronous transmission data from said bus service and for coding said asynchronous transmission data for transmission over said isochronous connection. The ISO-handler is a software module handling the incoming and outgoing data via the isochronous interface.

In case of transmitting transmission data from said device to said sophisticated gateway said ISO-handler is used for receiving said asynchronous transmission data over said isochronous connection and providing said asynchronous transmission data to said first bus service. In case the ISO-handler additionally handles a further isochronous connection, data from this isochronous connection is separated from said asynchronous transmission data. The asynchronous transmission data are provided to said first bus service and the isochronous transmission data are provided to an isochronous channel within said sophisticated gateway.

The isochronous data and asynchronous data are transmitted according to the underlying bus system standard.

An isochronous connection between a device, a physical gateway and a sophisticated gateway works the following:

The physical gateway packs asynchronous data from the device connected to bus system 1 into an isochronous or asynchronous channel and sends these data to the sophisticated gateway via bus system 2. Isochronous data (e.g. audio or video) are sent anyway in an isochronous channel and forwarded by the ISO-handler after reception from the physical gateway to the transcoder. Asynchronous data are sent via the bus service 2 to bus service 1 and then to the respective proxies. If asynchronous data are received in an isochronous channel they are unpacked by the ISO-handler 2 and forwarded to the bus service 1 and then to the respective proxies within the sophisticated gateway.

The reverse direction works in the same way, the other way around.

The bus service is only used to control the device. The isochronous stream (e.g. audio or video) does not use the bus service.

The bus service 206—shown in the figures—unpacks the Bluetooth data from the received derivative IEEE1394 data and vice versa. The bus service 405 then interprets the received Bluetooth data. The inventive step is here this 2 step approach which allows the transmission of e.g. Bluetooth data via e.g. IEEE1394.

Advantageously, said communication layer complies with the Universal Plug and Play and/or the UDP/TCP standard. As mentioned above, the Universal Plug and Play standard makes it possible for devices connected to said multiple-standard network to communicate with each other, i.e. exchange data, control information and/or the like.

In a preferred embodiment, said first non-IP physical data transfer standard and/or said second non-IP physical data transfer standard comply with any of the following standards: MOST, IEEE1394, Bluetooth, IEEE802.11, USB (Universal Serial Bus), Powerline.

In an advantageous embodiment, said sophisticated gateway further comprises a second bus service of said second non-IP physical data transfer standard. In case of transmitting transmission data from said sophisticated gateway to said device, said second bus service is used for deriving said derivative of said transmission data from said transmission data. In case of transmitting transmission data from said device to said sophisticated gateway, said second bus service is used for deriving said transmission data from said derivative of said transmission data.

The difference between the 1394 adapter (103) and the 1394 bus service (206) is the following: 103 does not know which data are tunnelled and which not. It's the task of 206 to separate the tunnelled from the not tunnelled data. Therefore the connection 206-405 is essential.

The invention further provides a physical gateway for connecting a device of a first non-IP physical data transfer standard to a multiple-standard network comprising: A first connecting means adapted for transmitting transmission data that comply with said first non-IP physical data transfer standard, an adapting means comprising at least one FIFO buffer, wherein said adapting means is adapted for coding said transmission data thus generating a derivative of said transmission data and further adapted for decoding said derivative of said transmission data thus generating said transmission data, wherein said derivative of said transmission data comply with a second non-IP physical data transfer standard that is different from said first non-IP physical data transfer standard, said physical gateway further comprising a second connecting means adapted for transmitting transmission data or said derivative of said transmission data according to said second non-IP physical data transfer standard.

This means the inventive physical gateway does not comprise a bus service. It is therefore very cheap in production and very flexible with respect to providing a gateway for devices that need to be connected to a multiple-standard network.

The inventive sophisticated gateway for the use in a multiple-standard network comprises: A connecting means adapted for transmitting transmission data or a derivative thereof, which transmission data comply with a first non-IP physical data transfer standard, and which derivative of said transmission data comply with a second non-IP physical data transfer standard that is different from said first non-IP physical data transfer standard, a communication layer adapted for receiving and/or sending communication data that comply with a communication layer data format, and a first bus service adapted for converting said communication data into said transmission data or vice versa.

The inventive multiple-standard network comprises at least one physical gateway as defined above, and at least one sophisticated gateway as defined above.

BRIEF DESCRIPTION OF THE SEVERAL VIEWS OF THE DRAWINGS

The invention and advantageous details thereof will be explained by the way of an exemplary embodiment thereof in the following with reference to the accompanying drawings in which.

DETAILED DESCRIPTION OF THE INVENTION

Figure 1:
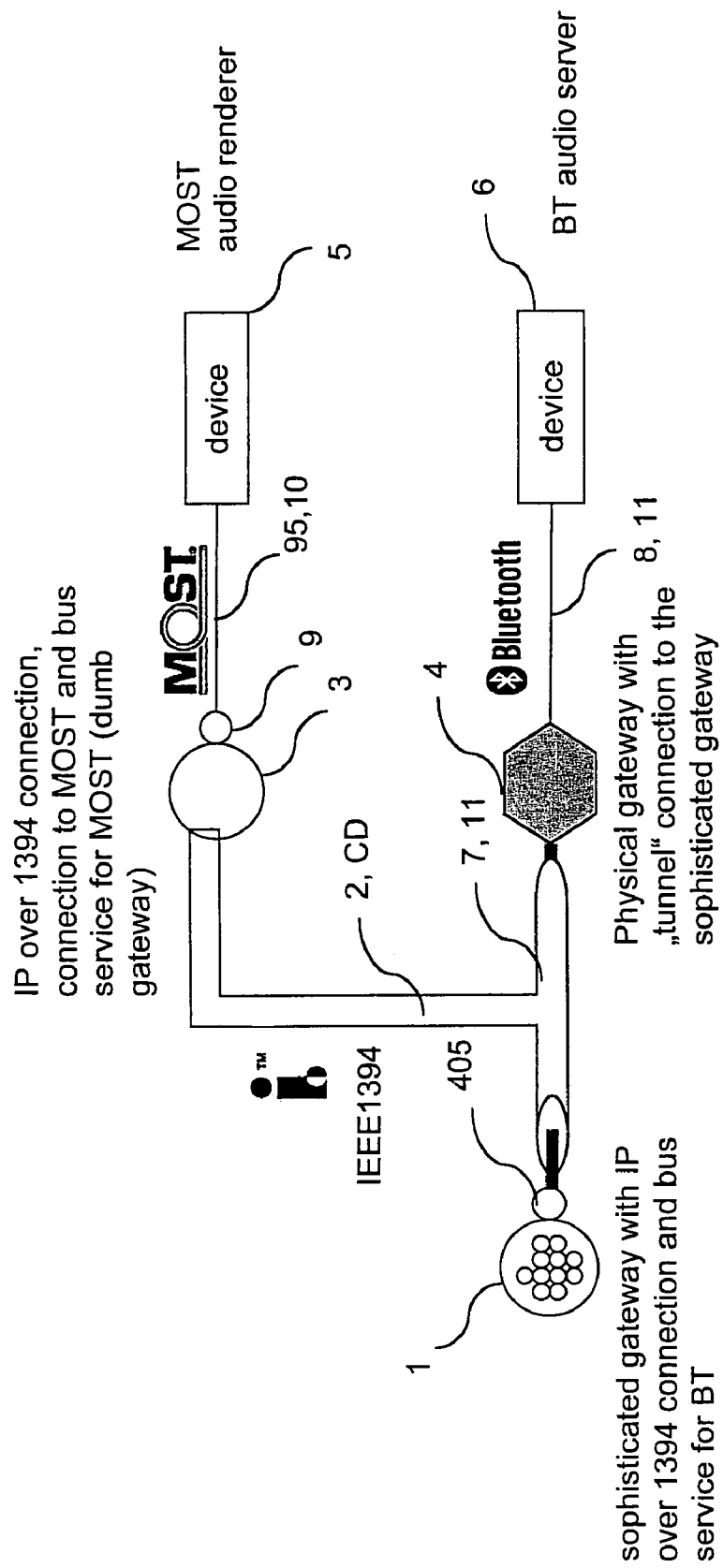
FIG. 1 shows an inventive network with a dumb gateway, a physical gateway, and a sophisticated gateway.

FIG. 1 shows a MOST audio renderer 5, i.e. a MOST amplifier that is connected to a dumb gateway 3, wherein a MOST bus service 9 is running on said dumb gateway 3. The dumb gateway 3 is connected with a sophisticated gateway 1 via an IEEE 1394 connection 2.

The MOST audio renderer sends MOST transmission data 10 to said dumb gateway 3. The MOST bus service 9, which is included into said dumb gateway 3, receives the MOST transmission data 10 and adapts the MOST transmission data 10 to comply with the Universal Plug and Play protocol set, in the following simply referred to as UPnP standard. The results are communication data CD that comply with the UPnP standard. In other words, the MOST bus service converts the MOST transmission data into said communication data CD. The dumb gateway 3 and its functions are explained in more detail in European patent application no. 02 017 621.0-1525, which is herewith incorporated by reference into this specification.

FIG. 1 further shows a Bluetooth audio server 6, in the following also referred to as Bluetooth BT device 6, which is connected to a physical gateway 4 by a Bluetooth BT connection 8. Said physical gateway 4 is connected to said sophisticated gateway 1 via an IEEE 1394 tunnel connection 7.

The Bluetooth audio server 6 sends Bluetooth transmission data 11 to said physical gateway 4 via said Bluetooth connection 8. Said Bluetooth transmission data 11 are received by said physical gateway 4 and immediately transmitted, i.e. send out to said sophisticated gateway 1 via said IEEE 1394 tunnel connection 7.

After the sophisticated gateway 1 has received said Bluetooth transmission data 11, said Bluetooth transmission data 11 are provided to a Bluetooth bus service 405 running on said sophisticated gateway 1. The Bluetooth bus service 405 converts the Bluetooth transmission data 11 to communication data CD that are provided to a communication layer 300 within said sophisticated gateway 1. As for the dumb gateway, said communication data CD comply with the UPnP standard, i.e. the communication layer data format.

One aspect of the invention can therefore be understood from FIG. 1: the dumb gateway 3 is providing said MOST bus service 9 (prior art gateway). Therefore, said dumb gateway 3 can only be used as a gateway for devices that comply with the MOST standard. The physical gateway 4, however, is not providing a bus service. Instead said physical gateway 4 simply tunnels the received Bluetooth transmission data 11 to said sophisticated gateway 1. Since said physical gateway 4 does not provide a specific bus service, i.e. a bus service according to a specific standard, said physical gateway 4 may be used for connecting devices for different standards to a multiple-standard network. In the example of FIG. 1, a Bluetooth device is connected to said multiple-standard network via said physical gateway 4.

Figure 2:
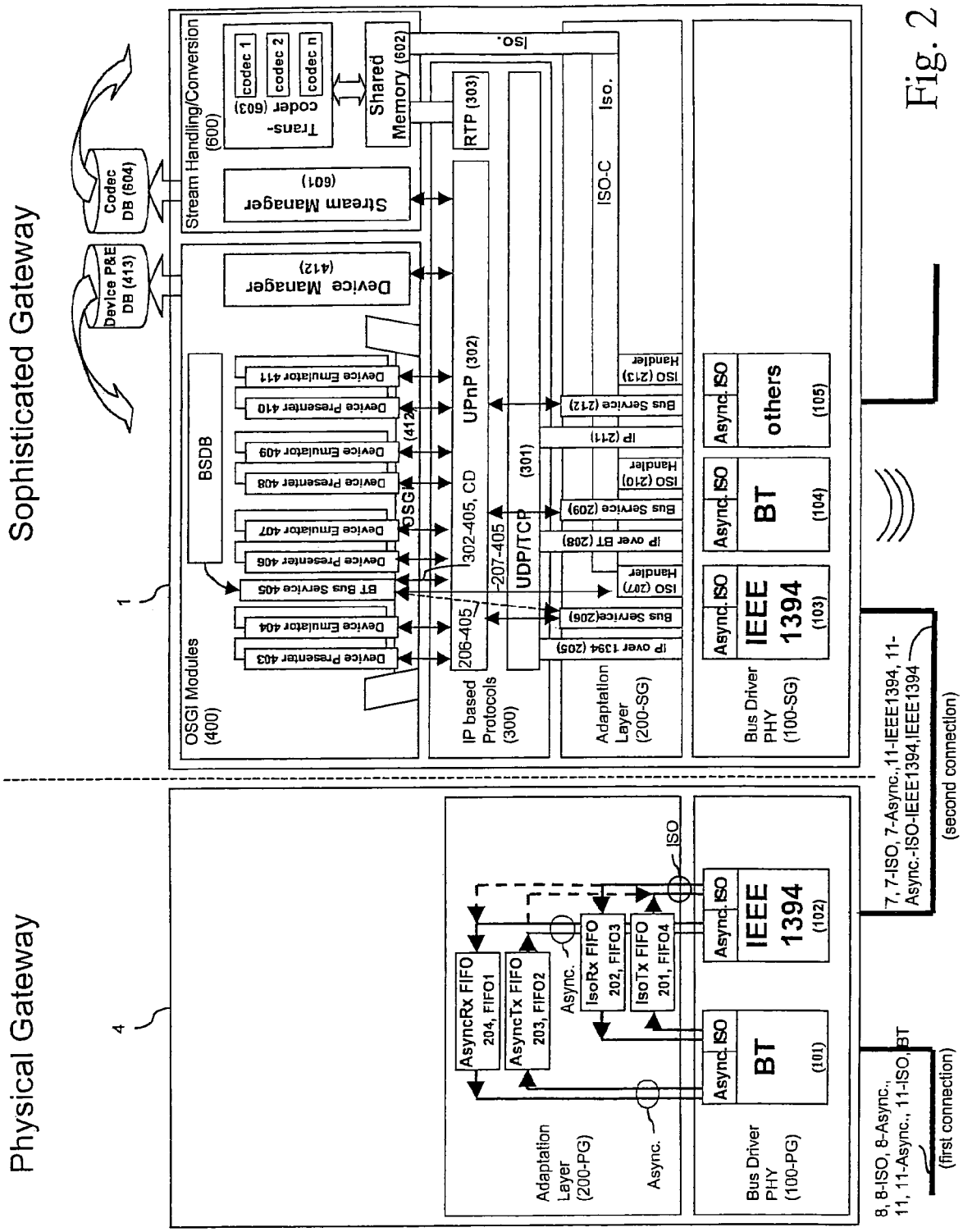
FIG. 2 shows in detail a physical gateway and a sophisticated gateway.

FIG. 2 shows said physical gateway 4 and said sophisticated gateway 1 in more detail.

As can be seen, said sophisticated gateway comprises an IP protocol block 300 with a Universal Plug and Play network layer 302.

On top of the IP protocol block 300 adaptation modules 403, 404, 406, 407, 408, 409, 410, and 411 for the different devices of a bus system are located. These modules provide the adaptation of the bus specific devices to an abstract device/application level. This abstraction layer is also provided by said Universal Plug and Play network layer 302, which is indicated by the arrows between the Universal Plug and Play network layer 302 and the respective adaptation modules.

The Universal Plug and Play (UPnP) network layer 302 here is a kind of central integration point for both, bus systems on transport level and devices on device/application level. The advantage of using a technology like UPnP is that UPnP is a protocol-based standard, which does not require a specific software environment. The modules therefore may run at any gateway in the network independent from the operating system and the software environment. For further information regarding the functioning of the Universal Plug and Play protocol set, see. European patent application EP 02 017 621.0.

Figure 3:
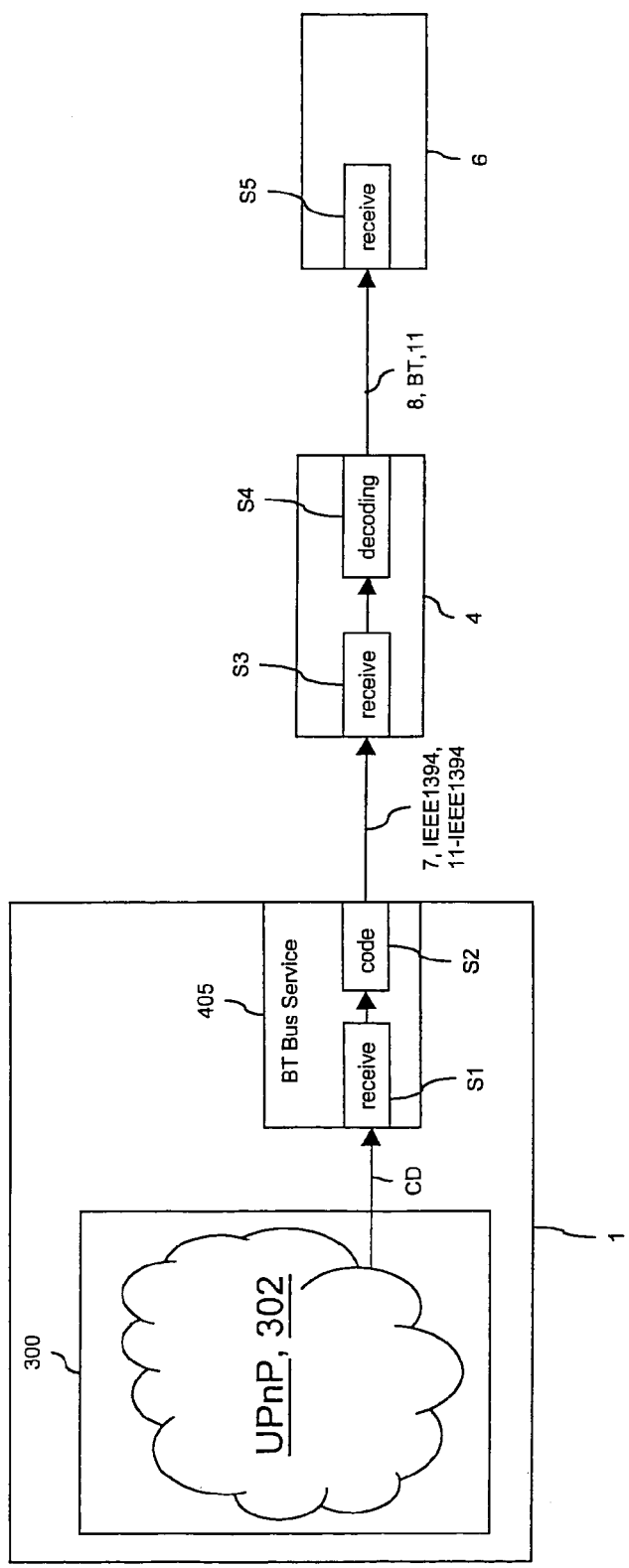
FIG. 3 shows a diagram explaining the data transmission from the communication layer to a Bluetooth audio server according to the invention.
Figure 4:
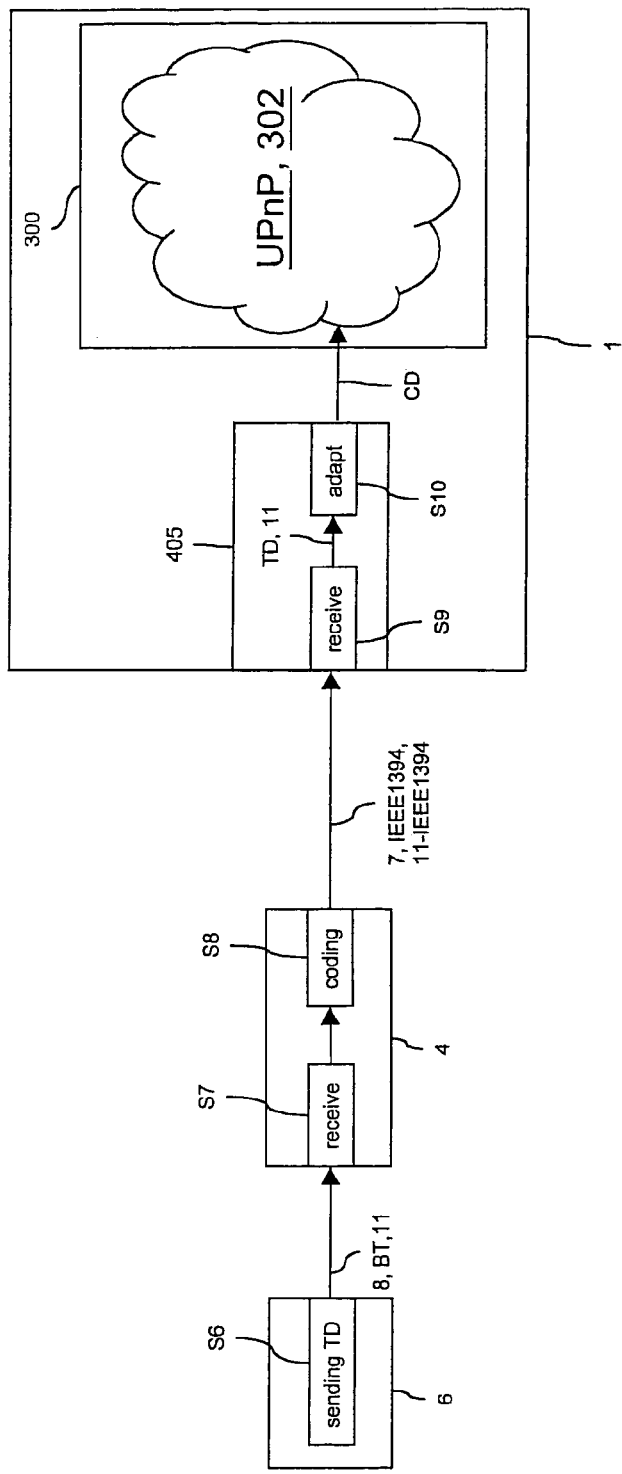
FIG. 4 shows a diagram explaining the data transmission from a Bluetooth audio server to the communication layer according to the invention.

For a better understanding of the invention, the following description is divided in two parts, the first part describing the data transmission from said communication layer 300 to said Bluetooth audio server 6 at hand of FIGS. 2 and 3, and the second part describes the data transmission from the Bluetooth audio server 6 to the sophisticated gateway 1 at hand of FIGS. 2 and 4.

Data Transmission from Communication Layer to Bluetooth Audio Server (A):

In case of data transmission from the Universal Plug and Play network layer 302 to the Bluetooth audio server 6 (A, FIG. 3), the Universal Plug and Play network layer 302 sends communication data CD to said Bluetooth bus service 405 via a first internal connection 302-405. The bus service 405 provides an UPnP presentation of a bus system. Here, the Bluetooth bus service 405 provides an UPnP presentation of the Bluetooth bus system of the Bluetooth audio server 6. "Providing a bus system" can also be seen as modifying i.e. adapting, changing or converting said communication data CD into said Bluetooth transmission data 11. In other words, the Bluetooth bus service 405 provides an interface between Bluetooth transmission data 11 and communication data CD.

After the communication data CD have been converted to Bluetooth transmission data 11 by said Bluetooth bus service 405, there are two possibilities for the further transmission of the Bluetooth transmission data 11. The Bluetooth transmission data 11 may be sent to said physical gateway 4 via an isochronous IEEE1394 connection 7-ISO or via an asynchronous IEEE1394 connection 7-Async. Both connections are part of the IEEE1394 tunnel connection 7.

In the following, first the transmission of data over said asynchronous IEEE1394 connection 7-Async. is explained and then the transmission over said isochronous, IEEE1394 connection 7-ISD.

In case of using said asynchronous IEEE1394 connection 7-Async. for data transfer from said sophisticated gateway 1 to said physical gateway 4, the Bluetooth transmission data 11, in the following also referred to as asynchronous Bluetooth transmission data 11-Async., are transmitted to an IEEE1394 bus service 206 via a second internal connection 206-405.

This IEEE1394 bus service 206 codes said asynchronous Bluetooth transmission data 11-Async. according to the IEEE1394 standard. Coding here means to perform steps such as e.g. adding IEEE1394 specific headers, and generating IEEE1394 standard conform packets. This means the asynchronous Bluetooth transmission data 11-Async. are prepared to be sent out according to the IEEE1394 standard. The output of the IEEE1394 bus service 206 are IEEE1394 coded Bluetooth transmission data 11-IEEE1394. These IEEE1394 coded Bluetooth transmission data 11-IEEE1394 are sent out to said physical gateway 4 by a first IEEE1394 adaptor 103 via said asynchronous IEEE1394 connection 7-Async. of said IEEE1394 tunnel connection 7.

The IEEE1394 coded Bluetooth transmission data 11-IEEE1394 are received at said physical gateway 4 by a second IEEE1394 adaptor 102.

The received IEEE1394 coded Bluetooth transmission data 11-IEEE1394 are then decoded in order to again obtain the asynchronous Bluetooth transmission data 11-Async., which are after decoding identical to the asynchronous Bluetooth transmission data 11-Async. that have been output by said Bluetooth bus service 405.

The asynchronous Bluetooth transmission data 11-Async. are then stored in a first FIFO buffer FIFO1 (FIFO=First In First Out), and read out by a first Bluetooth adapter 101. Alternatively the data can first be started in said first FIFO buffer FIFO1 and the converted, i. e. decoded. The first Bluetooth adapter 101 sends out the asynchronous Bluetooth transmission data 11-Async. via an asynchronous Bluetooth connection 8-Async. comprised within said Bluetooth connection 8. The asynchronous Bluetooth transmission data 11-Async. are then received by said Bluetooth audio server 6.

Note that the physical gateway 4 does not include a Bluetooth bus service. After the asynchronous Bluetooth transmission data 11-Async. have been read from said first FIFO buffer FIFO1, they can be transmitted immediately over said asynchronous Bluetooth connection 8-Async., i.e. without any modification. This is because said asynchronous Bluetooth transmission data 11-Async. are already of the correct format, i. e. of the Bluetooth standard, to be processed and transmitted by said first Bluetooth adapter 101.

As mentioned, it is also possible to send said asynchronous Bluetooth transmission data 11-Async. via said isochronous IEEE1394 connection 7-ISO. In this case, the asynchronous Bluetooth transmission data 11-Async. that are output by said Bluetooth bus service 405 are sent to an ISO-handler 207 via a third internal connection 207-405. The ISO-handler 207 codes the asynchronous Bluetooth transmission data 11-Async. to obtain isochronously coded asynchronous Bluetooth transmission data 11-Async.-ISO.

The isochronously coded asynchronous Bluetooth transmission data 11-Async.-ISO are then provided to said first IEEE1394 adapter which codes the data in order to obtain IEEE1394 coded isochronously coded asynchronous Bluetooth transmission data 11-Async.-ISO-IEEE1394. These IEEE1394 coded isochronously coded asynchronous Bluetooth transmission data 11-Async.-ISO-IEEE1394 are then received by said second IEEE1394 adapter 102. This second IEEE1394 adapter 102 decodes the IEEE1394 coded isochronously coded asynchronous Bluetooth transmission data 11-Async.-ISO-IEEE1394 in order to again obtain the isochronously coded asynchronous Bluetooth transmission data 11-Async.-ISO. The isochronously coded asynchronous Bluetooth transmission data 11-Async.-ISO are then stored in said first FIFO buffer FIFO1 and the processing continues as explained above.

In other words, asynchronous Bluetooth transmission data 11-Async. provided by said Bluetooth bus service 405 are sent from said sophisticated gateway 1 to said physical gateway 4 via an isochronous IEEE1394 connection, i. e. via said isochronous IEEE1394 connection 7-ISO.

In case of an isochronous connection, isochronous Bluetooth transmission data 11-ISO are received from a shared memory 602 and provided to said ISO handler 207 via an isochronous channel ISO-C. These isochronous Bluetooth transmission data are isochronously converted by said first IEEE1394 adapter 103 and sent out via said isochronous IEEE1394 connection 7-ISO to said physical gateway 4. Of course, as before the isochronous Bluetooth transmission data 11-ISO are coded by said IEEE1394 adapter 103 before sending.

The second IEEE1394 adapter 102 receives the coded isochronous Bluetooth transmission data 11-ISO and stores the isochronous Bluetooth transmission data 11-ISO in a third FIFO buffer FIFO3. The first Bluetooth adapter 101 then reads the isochronous Bluetooth transmission data 11-ISO from said third FIFO buffer FIFO3 and sends this data to said Bluetooth audio server 6.

FIG. 3 shows the data transmission from said Universal Plug and Play network layer 302 to said Bluetooth audio server 6 again, wherein the different steps can be seen in more detail.

Said communication data CD are sent out by said Universal Plug and Play network layer 302 and received in a first receiving step S1 by said Bluetooth bus service 405. Then, in a first coding step S2, said communication data CD are converted into said Bluetooth transmission data 11. Note that FIG. 3 does not distinguish between isochronous and asynchronous connections. The first coding step S2 also includes the coding of said Bluetooth transmission data 11 in order to obtain said IEEE1394 coded Bluetooth transmission data 11-IEEE1394. These IEEE1394 coded Bluetooth transmission data 11-IEEE1394 are then sent out to said physical gateway 4.

Said IEEE1394 coded Bluetooth transmission data 11-IEEE1394 are received in a second receiving step S3 by said physical gateway 4. In a following first decoding step S4, said IEEE1394 coded Bluetooth transmission data 11-IEEE1394 are decoded in order to again obtain said Bluetooth transmission data 11. These Bluetooth transmission data 11 are then stored in said first FIFO buffer FIFO1 or said third FIFO buffer FIFO3 depending on the type of connection (isochronous or asynchronous connection). The Bluetooth transmission data 11 are then sent out via said Bluetooth connection 8 to said Bluetooth audio server 6 and received within a third receiving step S5.

Data Transmission from Bluetooth Audio Server 6 to Universal Plug and Play Network Layer 302 (B):

In FIG. 2, in case of an isochronous connection from said Bluetooth audio server 6 to said Universal Plug and Play network layer 302, isochronous Bluetooth transmission data 11-ISO are sent from said Bluetooth audio server 6 to said physical gateway 4 via said isochronous Bluetooth connection 8-ISO. The isochronous Bluetooth transmission data 11-ISO are received by said first Bluetooth adapter 101 at said physical gateway 4 and stored in a fourth FIFO buffer FIFO4. The isochronous Bluetooth transmission data 11-ISO are then read out from said fourth FIFO buffer FIFO4 by said second IEEE1394 adapter 102 and IEEE1394 -coded such that they can be transmitted over said isochronous IEEE1394 connection 7-ISO. Again, coded means that respective header information and/or the like is added to said isochronous Bluetooth transmission data 11-ISO.

The IEEE1394 -coded isochronous Bluetooth transmission data are then sent to said sophisticated gateway 1 via said isochronous IEEE1394 connection 7-ISO and received by said first IEEE1394 adapter 103. The first IEEE1394 adapter 103 decodes the coded isochronous Bluetooth transmission data 11-ISO in order to obtain said isochronous Bluetooth transmission data 11-ISO. Said ISO-handler 207 then transfers said isochronous Bluetooth transmission data 11-ISO to said isochronous channel ISO-C. Said isochronous channel ISO-C transfers the isochronous Bluetooth transmission data to said shared memory 602 for further processing of the isochronous Bluetooth transmission data. Details with respect to the further processing can be found in the already cited European patent application EP 02 017 621.0.

In case said Bluetooth audio server 6 sends asynchronous Bluetooth transmission data 11-Async. over the asynchronous Bluetooth connection 8-Async., said asynchronous Bluetooth transmission data 11-Async. are received by said first Bluetooth adapter 101. These asynchronous Bluetooth transmission data 11-Async. are then stored in a second FIFO buffer FIFO2. The asynchronous Bluetooth transmission data 11-Async. are then read out from said second FIFO buffer FIFO2 by said second IEEE1394 adapter 102 and coded for the transmission over said asynchronous IEEE1394 connection 7-Async. The coded asynchronous Bluetooth transmission data are then received by said first IEEE1394 adapter 103 at said sophisticated gateway 1 and decoded in order to again obtain said asynchronous Bluetooth transmission data 11-Async. They are then transferred to said Bluetooth bus service 405 via said second internal connection 206-405. The Bluetooth bus service 405 converts the asynchronous Bluetooth transmission data 11-Async. into communication data CD that are supplied to said Universal Plug and Play network layer 302.

It is also possible to send said asynchronous Bluetooth transmission data 11-Async. over said isochronous IEEE1394 connection 7-ISO. In this case said second IEEE1394 adapter 102 reads said asynchronous Bluetooth transmission data 11-Async. from said second FIFO buffer FIFO2, codes said asynchronous Bluetooth transmission data 11-Async. in order to sent them over said isochronous IEEE1394 connection 7-ISO.

Preferably an asynchronous channel is used for asynchronous control data. But sometimes resources are limited or not available, so isochronous channels are used for those data. Another consideration is 'Quality of Service'. If audio or video data are sent asynchronously, it's better to allocate an isochronous channel in order to guarantee the bandwidth and quality of service.

The coded asynchronous Bluetooth transmission data 11-Async. are then sent from said physical gateway 4 to said sophisticated gateway 1 via said isochronous IEEE1394 connection 7-ISO and received by said first IEEE1394 adapter 103. The first IEEE1394 adapter 103 decodes the coded asynchronous Bluetooth transmission data 11-Async. and supplies these data to said ISO-handler 207. The ISO-handler 207 detects that the received data are asynchronous data and supplies the data, i.e. the asynchronous Bluetooth transmission data 11-Async. to said Bluetooth bus service 405, via said third internal connection 207-405. The Bluetooth bus service 405 converts the received asynchronous Bluetooth transmission data 11-Async. into communication data CD and supplies these communication data CD to said Universal Plug and Play network layer 302 via said first internal connection 302-405. There is an information in the isochronous packet header, which describes the content of the packet (isochronous or asynchronous data).

FIG. 4 shows the data transmission from the Bluetooth audio server 6 to the Universal Plug and Play network layer 302 again in a block diagram, wherein no distinction is made between isochronous connections.

The Bluetooth audio server 6 sends out Bluetooth transmission data 11 to said physical gateway 4 in a first sending step S6. The Bluetooth transmission data are received at said physical gateway 4 in a fourth receiving step S7. The Bluetooth transmission data 11 are then stored in a FIFO buffer, i.e. the second FIFO buffer FIFO2 or the fourth FIFO buffer FIFO4 depending on the type of the connection, in a second coding step S8. Also in said second coding step S8, said Bluetooth transmission data 11 are coded according to the IEEE1394 standard in order to obtain IEEE1394 coded Bluetooth transmission data 11-IEEE1394. These IEEE1394 coded Bluetooth transmission data 11-IEEE1394 are then sent to said sophisticated gateway 1 and received in a fifth receiving step S9. The fifth receiving step S9 includes the decoding of said IEEE1394 coded Bluetooth transmission data 11-1394, in order to obtain said Bluetooth transmission data 11. The (decoded) Bluetooth transmission data 11 are then supplied to a third coding step S10. Within this third coding step S10, the Bluetooth transmission data 11 are adapted, i.e. modified or changed in order to obtain said communication data CD that comply with the UPnP standard. The communication data CD are then supplied to said Universal Plug and Play network layer 302 within said IP protocol block 300.

The fourth receiving step S7 and the second coding step S8 are performed within the physical gateway 4. The fifth receiving step S9 and the third coding step S10 are performed within the Bluetooth bus service 405.

Figure 5:
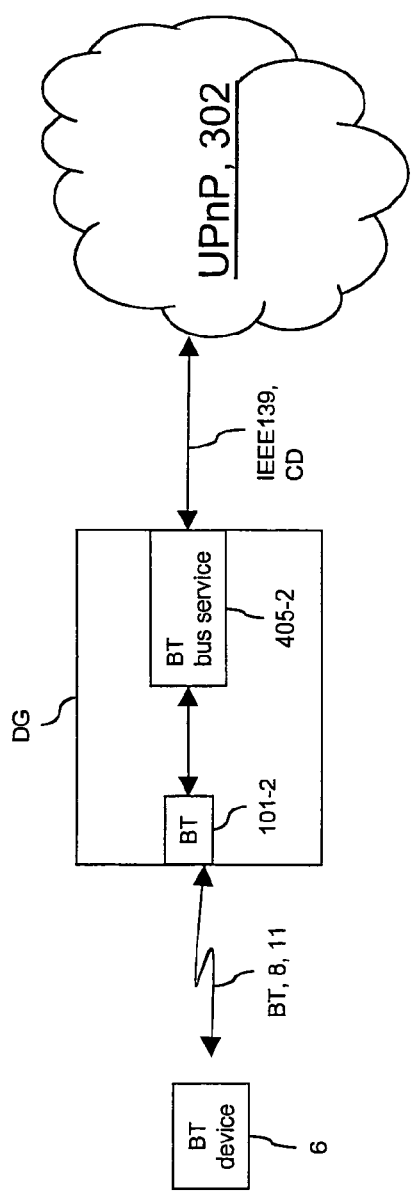
FIG. 5 shows the data transmission from the Bluetooth audio server to the communication layer according to prior art.
Figure 6:
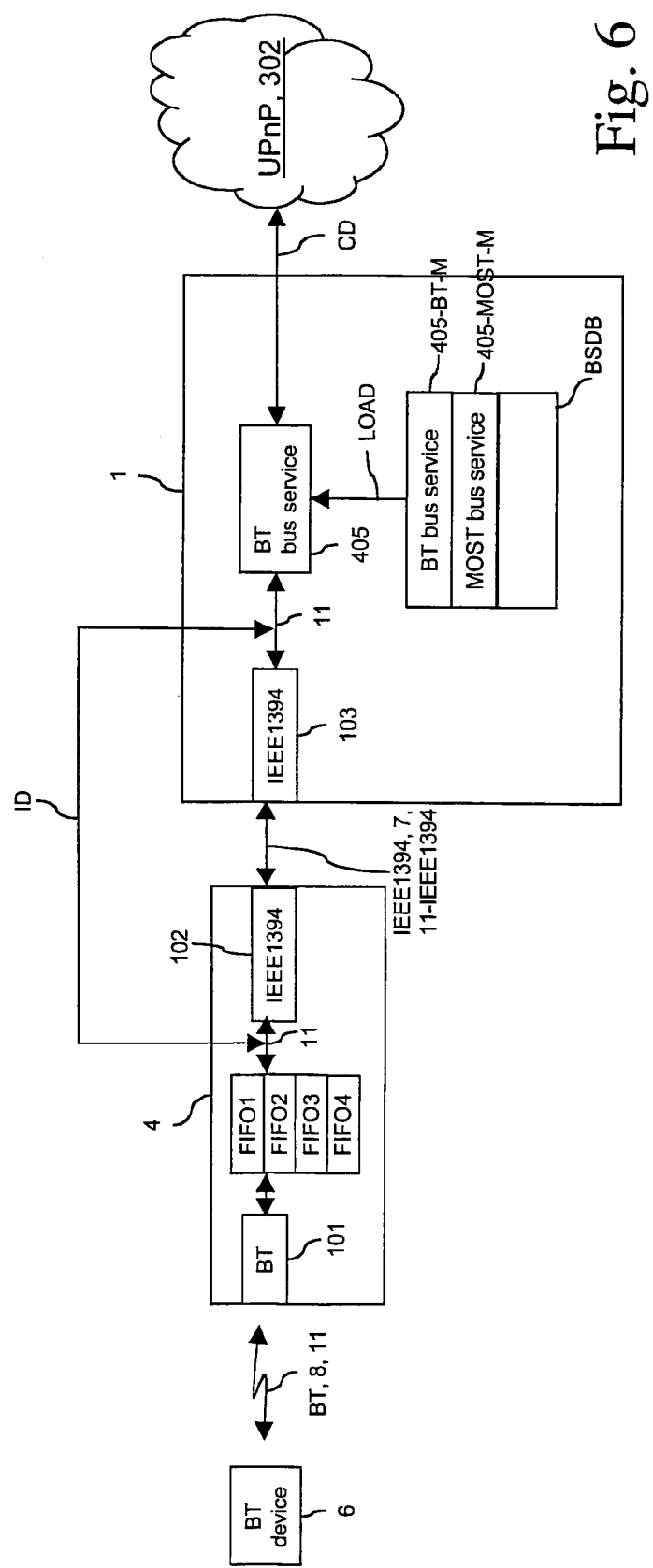
FIG. 6 shows a further diagram explaining the data transfer between the Bluetooth audio server and the communication layer according to the invention.

FIGS. 5 and 6 explain the difference of the invention with respect to prior art as given e.g. by European patent application EP 02 017 621.0. In FIG. 5, the data transmission between said Bluetooth audio server 6 and said Universal Plug and Play network layer 302 is realized according to prior art. FIG. 6 shows the data transmission according to the invention.

In FIG. 5, the Bluetooth audio server 6 sends Bluetooth transmission data 11 to a dumb gateway DG. The Bluetooth transmission data 11 are received by a dumb gateway Bluetooth adapter 101-2. This dumb gateway Bluetooth adapter 101-2 corresponds to said first Bluetooth adapter 101.

The dumb gateway DG comprises a dumb gateway Bluetooth bus service 405-2. This dumb gateway Bluetooth bus service 405-2 converts the Bluetooth transmission data 11 into communication data CD that comply with the UPnP standard. The communication data CD are supplied to the Universal Plug and Play network layer 302. As already mentioned, the dumb gateway DG runs a dumb gateway Bluetooth bus service 405-2 and the dumb gateway DG can therefore only be used as a gateway for connecting a Bluetooth device to said Universal Plug and Play network layer 302.

In FIG. 6, said Bluetooth audio server 6 sends Bluetooth transmission data 11 to said physical gateway 4. As explained above, said first Bluetooth adapter 101 receives the Bluetooth transmission data 11 and supplies the respective FIFO buffers with the Bluetooth transmission data 11. Which of the FIFO buffers are used, depends on the type of the connection (isochronous or asynchronous) between the physical gateway 4 and the sophisticated gateway 1. The Bluetooth transmission data 11 that are stored in the respective FIFO buffers are then sent out to said sophisticated gateway 1 by said second IEEE1394 adapter 102. In order to send the Bluetooth transmission data 11, these data are coded by said second IEEE1394 adapter 102 thus generating IEEE1394 coded Bluetooth transmission data 11-IEEE1394.

After the transmission of the IEEE1394 coded Bluetooth transmission data 11-IEEE1394 over said IEEE1394 tunnel connection 7, said IEEE1394 coded Bluetooth transmission data 11-IEEE1394 are received by said first IEEE1394 adapter 103. As explained above, the first IEEE1394 adapter 103 decodes the IEEE1394 coded Bluetooth transmission data 11-IEEE1394 in order to obtain the Bluetooth transmission data 11.

The step of coding of the Bluetooth transmission data 11 by the second IEEE1394 adapter 102, the step of transmission over said IEEE1394 tunnel connection 7, and the step of decoding by said first IEEE1394 adapter 103 is referred to as tunneling Bluetooth transmission data in this specification or tunneling transmission data. In FIG. 6, a two-way arrow ID is depicted showing the points during the transmission at which points the transmission data, i.e. in case of Bluetooth data the Bluetooth transmission data 11, are exactly identical. The second IEEE1394 adapter 102, the IEEE1394 tunnel connection 7, and the first IEEE1394 adapter 103 may be regarded as providing lower layers for data transport with respect to the two points shown by the two way arrow ID in FIG. 6.

The first IEEE1394 adapter 103 then supplies the Bluetooth transmission data 11 to said Bluetooth bus service 405. The Bluetooth bus service 405 converts the Bluetooth transmission data 11 into communication data CD and supplies these communication data CD to said Universal Plug and Play network layer 302.

FIG. 6 also shows a bus service data base BSDB. Within this bus service data base BSDB different bus services are stored. In the bus service data base BSDB of FIG. 6, a Bluetooth bus service module 405-BT-M and a MOST bus service module 405-MOST-M are stored. Note that these are only exemplary bus service modules and further bus service modules for other standards and even for future upcoming standards can be easily incorporated. Since in the example of FIG. 6, a Bluetooth device is connected to said Universal Plug and Play network layer 302, the Bluetooth bus service module 405-BT-M is loaded by the sophisticated gateway 1.

In the figures, the device manager 412 is informed in case a specific bus service is needed. In case of FIG. 2 either the Bus service 206 or the ISO handler 207 requests the device manager 412 to load the Bluetooth Bus service 405, depending on whether isochronous or asynchronous Bluetooth data are received first.

In the following, further elucidations are given that may help a person skilled in the art to get a better understanding of the invention:

There is a need to exchange data between various multimedia devices. These devices are usually connected to different bus systems and/or wireless systems. In order to exchange control data, status data, stream data, etc. these bus systems need to be connected. Usually this is done by a Gateway or bridge device, which interfaces to the different physical layers and maps the commands and data.

In order to be able to guarantee the interoperability of new (in future upcoming) devices and bus systems, there is a need to achieve this by utilizing existing infrastructure. Furthermore it needs to be considered that not all gateways are highly sophisticated. There is a need to incorporate cheap (dumb) gateways in the overall network topology by guaranteeing a high level of interoperability.

This problem can be solved by distributing a specific native Bus Service Interface over the network. This Bus Service Interface can be accessed on all gateway devices. This allows the incorporation of dumb gateways, which just provide the bus API. The device specific software modules can run distributed on other intelligent gateways.

This idea allows using cheap gateways without reducing the level of interoperability.

This mechanism is described in the European Patent Application No.:02 017 621.0.

An inventive idea here is to run the bus service at a remote location. This allows the design of even cheaper gateways (physical gateways). These physical gateways have just two physical interfaces and tunnel all the relevant data from one bus system over the other bus system. The bus service itself is then running on a different gateway as e.g. a software component or an ASIC.

The problem solved by the invention may also be formulated as follows:

There is a need to exchange data between various multimedia devices. These devices are usually connected to different bus systems respectively wireless systems. In order to exchange control data, status data, stream data, etc. these bus systems need to be connected. Usually this is done by a gateway or bridge device, which interfaces to the different physical layer and maps the commands and data. Due to the large number of physical layers, devices, command sets, and data stream formats there are a lot of different gateways needed.

In fast changing environments like in home-, car- or telecommunication networks, new devices with new protocols or data formats need to be connected. This causes big problems with such kind of static gateways, which don't know the new protocols, command sets and data formats. Furthermore there is a need to design small and inexpensive gateways for the huge number of different bus systems that need to be interconnected.

An idea of the invention is to solve this problem by a generic and cheap gateway architecture.

This means the generic architecture allows to plug in any number of inexpensive physical gateways and to run the respective bus services on sophisticated remote gateways.

The bus service modules are loaded dynamically, depending on the connected wired or wireless systems.

The relevant data are tunnelled over a different bus system from the physical gateway to the gateway device where the bus service is running.

That way it is ensured that the entire architecture is fully generic and flexible. The Software does not have to be changed if new devices or bus systems are connected or new protocols need to be translated or new data formats need to be en-, de- or trans-coded.

This architecture ensures an easy, cheap and user friendly way to extend the network. A main advantage of the invention is, that the consumer can connect new devices with new protocols, command sets and data formats to the network without taking care of the gateway. This means he can use already existing physical gateways. This architecture also eases the design of future proof gateways and it gives more flexibility in planning and designing the network topologies.

Description of the Figures

FIG. 1:

This figure describes an abstract scenario in which three gateways and two devices are incorporated.

An IEEE1394 audio renderer device 5 is connected to a Dumb Gateway 3. The IEEE1394 Bus Service in the Dumb Gateway 9 communicates with all the translation and transcoding modules running on the Sophisticated Gateway 1. In order to allow the design of even cheaper gateways than the Dumb Gateway, the Bus Service was shifted to the Sophisticated Gateway 1 and all relevant Bluetooth data between the simple Physical Gateway 4 and the bus service 10 residing on the Sophisticated Gateway 1 are tunnelled over another bus system, here e.g. the IEEE1394 connection 2.

FIG. 2:

This figure shows the internal architecture of the Physical Gateway (left) and the Sophisticated Gateway (right).

The structure of the Physical Gateway is rather simple. The asynchronous and isochronous data provided by the MOST driver 101 are interfaced to the IEEE1394 driver 102. In order to guarantee a smooth transfer FIFO's for both directions and separate ones for asynchronous and isochronous data are used 201, 202, 203, 204. The 1394 driver will send the isochronous MOST data in an isochronous channel and the asynchronous data in an asynchronous way over IEEE1394 to the Sophisticated Gateway. These data are received by the IEEE1394 Bus Service 206 and forwarded to the MOST Bus Service 405. This remote Bus Service is a loadable module. This ensures that Bus Service modules can be loaded for other and even future upcoming bus systems.

Alternatively the asynchronous MOST data could also be tunnelled in an isochronous channel. In this case the Iso Handler 207 will feed these data directly to the MOST Bus Service 405 if such an isochronous tunnel channel is received.

The invention thus may be seen as providing an architecture for an inexpensive generic gateway solution comprising a physical gateway with at least two network adapters (physical and data link layer), and an adaptation layer which interfaces the data from the first network adapter to the second network adapter; and a sophisticated gateway with at least one network adapter, and a bus service module which communicates with the physical gateway via local bus service and/or ISO-handler.

According to the invention, all relevant bus traffic from the first bus system is tunneled over the second bus system to a remote bus service of the first bus system. The remote bus service of the first bus system runs on the sophisticated gateway.

Further, according to the invention, all isochronous data of the bus system maybe tunneled in an isochronous channel of the second bus system to an ISO-handler which forwards the data to the remote bus service of the first bus system within the sophisticated gateway.

It is also possible that all asynchronous data of the first bus system is tunneled over an asynchronous or synchronous connection, i.e. an asynchronous or isochronous channel of the second bus system via the bus service of the second bus system or via the ISO-handler of the second bus system to the loadable bus service module of the first bus system.

Information about the Interface Between the "Dumb" Gateways and Home Network Devices:

The interface between the "dumb" gateways and the home network devices is the native communication system (e.g. IEEE1394, Bluetooth, IEEE802.1, USB, Powerline, etc.). From the native home network device point of view, the dumb gateway will behave like a native device too. So the communication is based on the native protocols.

Example: If a gateway device emulates a server device into a Bluetooth piconet, the gateway will behave from the Bluetooth point of view like a Bluetooth server device.

Information about the Components in FIG. 2:

FIG. 2 shows the internal architecture of the physical gateway (left) and the sophisticated gateway (right). The structure of the physical gateway is rather simple. The asynchronous and isochronous data provided by the BT driver 101 are interfaced to the IEEE1394 driver 102. In order to guarantee a smooth transfer FIFO's for both directions and separate for asynchronous and isochronous data are used 201, 202, 203, 204. The 1394 driver will send the isochronous BT data in an isochronous channel and the asynchronous data in an asynchronous way over IEEE1394 to the sophisticated gateway. These data are received by the IEEE1394 bus service 206 and forwarded to the BT bus service 405. This remote bus service is a loadable module. This ensures that bus service modules can be loaded for other and even future upcoming bus systems. Alternatively the asynchronous MOST data can also be tunneled in an isochronous channel. In this case the ISO-handler 207 will feed these data directly to the BT bus service 405 if such an isochronous tunnel channel is received.

The communication architecture of a physical gateway device 4 is also shown in FIG. 2. Beginning from the bottom, there is a block containing the bus drivers and physical bus interfaces 100-PG followed by the adaptation layer 200-PG, which brings all the different transport mechanisms of the bus system to an abstract level.

This abstract level is provided by an isochronous and an asynchronous part within the sophisticated gateway. The asynchronous part is given by a block of IP based protocols such as TCP/UDP 301 and UPnP 302. The isochronous part is handled by the stream handling/conversion block 600 whereas the streaming data is handled directly by a shared memory module 602.

On top of the IP protocol block 300 the adaptation modules for the different devices of a bus system are located. These modules provide the adaptation of the bus specific devices to an abstract device/application level. This second abstraction layer is also provided by UPnP, which is indicated by the arrows. UPnP here is a kind of central integration point for both, bus systems on transport level and devices on device/application level. The advantage of using a technology such as UPnP here is that UPnP is a protocol based standard, which do not require a specific software environment. The modules therefore may run at any gateway in the network independent from the operating system OS and the software environment.

There are modules based on a common platform for distributed applications such as OSGI. An OSGI module is running on any sophisticated gateway platform providing a corresponding standardized software platform as JAVA/OSGI 412 and has to be implemented only once.

OSGI stands for "Open Services Gateway Initiative". It's an open standard.

The following components are part of the architecture.

Device Presenter (403, 406, 408, 410)
The device presenter is presenting a real device on a bus system as a generic UPnP device/service.

Device Emulator (404, 407, 409, 411)
The device emulator is emulating a device on a bus system based on a generic UPnP presentation of a device/service.

Device P&E DB (413)
External or internal database providing device emulator and presenter modules.

Codec DB (604)
External or internal database providing codecs for en-, de- and transcoding of audio and video.

Device Manager (412)
Manager for finding, loading and assigning device presenter and emulator modules for the devices found on the bus system.

Stream Manager (601)
Manager for establishing a streaming connection between two devices in a network of gateways.

Transcoder (603)
Component for the encoding, decoding and transcoding of audio and video streams.

Shared Memory (602)
Module for the handling of the shared memory access used for stream buffering and synchronization.

UPnP (302)
The Universal Plug and Play protocol set.

RTP (303)
Real-time Transport Protocol (RFC 1889—RTP: A Transport Protocol for Real-Time Applications). RTP is used as a default streaming mechanism between gateway devices if no isochronous transport channel is available.

TCP/UDP (301)
TCP (RFC 793—Transmission Control Protocol) and UDP (RFC 768—User Data-gram Protocol) are used as transport protocols on top of IP.

IP (IP over . . . ) (205, 208, 211)
Implementation of IP on different bus systems. This IP channel is used for the tunneling of any communication between gateway devices. There are no connections from these modules to the bluetooth bus service 405 in FIG. 2 because IP traffic is not routed to the bus services. IP traffic is directly forwarded to the IP/UDP/TCP layer 301.

Bus service (206, 209, 212, 405)
The bus service provides an UPnP presentation of a bus system, which is used by the device presenters and device emulators. The bus service also controls the handling by isochronous data by the ISO handler.

ISO handler (207, 210, 213)
The ISO-handler handles the extraction and insertion of isochronous streams for a bus system. Its operation is controlled by the corresponding bus interface. The isochronous data is directly written to a shared memory module for buffering.

Physical Interfaces & Bus Driver (103, 104, 105)
The physical interfaces adapt the gateway physically to the native communication systems (e.g. IEEE1394, Bluetooth, etc.). They consist of the connector, signal processing and data link layer. The bus driver covers all the bus system specific house keeping functions and interfaces to the adaptation layer.

The invention provides very low cost gateways connecting new bus systems to existing networks.

REFERENCE SYMBOLS

1 sophisticated gateway
2 IEEE1394 connection
3 dumb gateway
4 physical gateway
5 MOST audio renderer
6 Bluetooth audio server/Bluetooth device
7 IEEE1394 tunnel connection
7-Async. asynchronous IEEE1394 connection
7-ISO isochronous IEEE1394 connection
8 Bluetooth (BT) connection
8-Async. asynchronous Bluetooth connection
8-ISO isochronous Bluetooth connection 9 MOST bus service
10 MOST transmission data
11 Bluetooth transmission data
11-Async. asynchronous Bluetooth transmission data
11-IEEE1394 IEEE1394 coded Bluetooth transmission data
11-ISO isochronous Bluetooth transmission data
11-Async.-ISO isochronously coded asynchronous Bluetooth transmission data
11-Async.-ISO-IEEE1394 IEEE1394 coded isochronously coded asynchronous Bluetooth transmission data
95 MOST connection
101-2 dumb gateway Bluetooth adapter
101 first Bluetooth adapter
102 second IEEE1394 adapter
103 first IEEE1394 adapter
206 IEEE1394 bus service
206-405 second internal connection
207 ISO-handler
207-405 third internal connection
300 IP protocol block
302 Universal Plug and Play network layer
302-405 first internal connection
405-2 dumb gateway Bluetooth bus service
405 Bluetooth bus service
405-BT-M Bluetooth bus service module
405-MOST-M MOST bus service module
602 shared memory
Async. asynchronous connection
BSDB bus service data base
BT Bluetooth
FIFO1 first FIFO (=First In First Out) buffer
FIFO2 second FIFO buffer
FIFO3 third FIFO buffer
FIFO4 fourth FIFO buffer
ISO isochronous connection
ISO-c isochronous channel
MOST Media Oriented System Transport
S1 first receiving step
S2 first coding step
S3 second receiving step
S4 first decoding step
S5 third receiving step
S6 first sending step
S7 fourth receiving step
S8 second coding step
S9 fifth receiving step
S10 third coding step
IEEE1394 IEEE standard for high speed serial connections, also known as "Firewire"
IEEE802.1 IEEE standard for wireless connections
USB Universal Serial Bus

The invention claimed is:

1. Method for data transfer in a multiple-standard network, comprising:
at least one physical gateway, at least one sophisticated gateway, and at least one device, wherein said physical gateway, said sophisticated gateway, and said device are nodes of said multiple-standard network,
a first connection between said device and said physical gateway, wherein said first connection operates according to a first non-IP physical data transfer standard,
a second connection between said physical gateway and said sophisticated gateway, wherein said second connection operates according to a second non-IP physical data transfer standard, which second non-IP physical data transfer standard is different from said first non-IP physical data transfer standard,
a communication layer that is used by said device, which communication layer receives and/or sends out communication data that comply with a communication layer data format,
wherein said sophisticated gateway comprises a first bus service of said first non-IP physical data transfer standard, which first bus service adapts transmission data complying with said first non-IP physical data transfer standard to said communication layer data format or vice versa, said method comprising the following steps, in case of transmitting transmission data from said sophisticated gateway to said device:
receiving communication data from said communication layer,
using said first bus service for converting the received communication data into said transmission data complying with said first non-IP physical data transfer standard,
transmitting said transmission data or a derivative thereof from said sophisticated gateway to said physical gateway, using said second connection,
transmitting said transmission data from said physical gateway to said device using said first connection, and
receiving said transmission data at said device.

2. Method according to claim 1 further comprising the following steps, in case of transmitting transmission data from said device to said sophisticated gateway:
transmitting transmission data from said device to said physical gateway using said first connection,
transmitting said transmission data or a derivative thereof from said physical gateway to said sophisticated gateway using said second connection,
using said first bus service for converting the received transmission data into said communication data complying with said communication layer data format, and
receiving said communication data at said communication layer.

3. A method for data transfer in a multiple-standard network, comprising:
at least one physical gateway, at least one sophisticated gateway, and at least one device, wherein said physical gateway, said sophisticated gateway, and said device are nodes of said multiple-standard network,
a first connection between said device and said physical gateway, wherein said first connection operates according to a first non-IP physical data transfer standard,
a second connection between said physical gateway and said sophisticated gateway, wherein said second connection operates according to a second non-IP physical data transfer standard, which second non-IP physical data transfer standard is different from said first non-IP physical data transfer standard,
a communication layer that is used by said device, which communication layer receives and/or sends out communication data that comply with a communication layer data format,
wherein said sophisticated gateway comprises a first bus service of said first non-IP physical data transfer standard, which first bus service adapts transmission data complying with said first non-IP physical data transfer standard to said communication layer data format or vice versa, said method comprising the following steps, in case of transmitting transmission data from said device to said sophisticated gateway:
transmitting transmission data from said device to said physical gateway using said first connection, transmitting said transmission data or a derivative thereof from said physical gateway to said sophisticated gateway using said second connection,
using said first bus service for converting the received transmission data into said communication data complying with said communication layer data format, and
receiving said communication data at said communication layer.

4. The method of claim 3 further comprising the following steps, in case of transmitting transmission data from said sophisticated gateway to said device:
receiving communication data from said communication layer,
using said first bus service for converting the received communication data into said transmission data complying with said first non-IP physical data transfer standard,
transmitting said transmission data or a derivative thereof from said sophisticated gateway to said physical gateway, using said second connection,
transmitting said transmission data from said physical gateway to said device using said first connection, and
receiving said transmission data at said device.

5. The method according to claims 1 or 3, wherein said first bus service is selected and/or loaded from a bus service data base.

6. The method according to claims 1 or 3, wherein said communication layer provides data transfer, controlling functions, device discovery functions, eventing functions for said device.

7. The method according to claims 1 or 3, further comprising:
storing said transmission data in a First In First Out (FIFO) buffer within said physical gateway, in case of transmitting transmission data from said device to said sophisticated gateway:
coding said transmission data within said physical gateway in order to obtain said derivative of said transmission data, and
transmitting said derivative of said transmission data over said second connection from said physical gateway to said sophisticated gateway;
in case of transmitting transmission data from said sophisticated gateway to said device:
decoding said derivative of said transmission data within said physical gateway in order to obtain said transmission data, and
transmitting said transmission data over said first connection from said physical gateway to said device.

8. The method according to claims 1 or 3, wherein
said first connection comprises an asynchronous connection and said transmission data comprise asynchronous transmission data, and
said second connection comprises an isochronous connection,
said method comprising a step of transmitting said asynchronous transmission data via said isochronous connection.

9. The method according to claim 8, wherein
said sophisticated gateway comprises an ISO-handler, and
in case of transmitting transmission data from said sophisticated gateway to said device:
using said ISO-handler for receiving asynchronous transmission data from said first bus service and coding said asynchronous transmission data for transmission over said isochronous connection;

in case of transmitting transmission data from said device to said sophisticated gateway:
using said ISO-handler for receiving said asynchronous transmission data over said isochronous connection and providing said asynchronous transmission data to said first bus service.

10. The method according to claim 1 or 3, wherein said communication layer complies with the Universal Plug And Play and/or the UDP/TCP Standard.

11. The method according claim 1 or 3, wherein said first non-IP physical data transfer standard and/or said second non-IP physical data transfer standard comply with any of the following standards:
MOST,
IEEE1394,
Bluetooth,
IEEE802.11,
USB,
Powerline,
any home, automotive, and/or IT network standard.

12. The method according to claim 1 or 3, wherein said sophisticated gateway comprises a second bus service of said second non-IP physical data transfer standard, and in case of transmitting transmission data from said sophisticated gateway to said device:
using said second bus service for deriving said derivative of said transmission data from said transmission data, in case of transmitting transmission data from said device to said sophisticated gateway:
using said second bus service for deriving said transmission data from said derivative of said transmission data.

13. Network components for a multiple-standard network that are adapted for performing the steps according to claim 1 or 3.

14. A sophisticated gateway, comprising:
a connector adapted to transmit transmission data or a derivative thereof, which transmission data comply with a first non-IP physical data transfer standard, and which derivative of said transmission data comply with a second non-IP physical data transfer standard that is different from said first non-IP physical data transfer standard,
a tunnel connection between said sophisticated gateway and a physical gateway, said tunnel connection tunneling said transmission data to said physical gateway,
a communication layer adapted for receiving and/or sending communication data that comply with a communication layer data format,
a first bus service adapted for converting said communication data into said transmission data or vice versa.

15. A gateway device, comprising:
a first connector adapted to send/receive first transmission data of a first non-IP physical data transfer standard to/from a device;
an adaptation layer adapted to generate second transmission data of a second non-IP physical data transfer standard based on an encapsulation of said first transmission data, and further adapted to generate said first transmission data based on a decapsulation of said second transmission data;
a second connector adapted to send/receive said transmission data to/from a network device connected to said gateway device; and a first FIFO buffer and a second FIFO buffer adapted to process an isochronous data stream and an asynchronous data stream, respectively.

16. A system, comprising:
a device having a first connection of a first non-IP physical data transfer standard:
a first gateway device connected to said device via said first connection, said gateway device having a second connection of a second non-IP physical data transfer standard;
a second gateway device connected to said first gateway device via a second connection, wherein said second connection is a tunnel connection tunneling first data of said device and of said first non-IP physical data transfer standard to said second gateway device, wherein said first data are encapsulated in second data of said second non-IP physical data transfer standard.

* * * * *